Feb. 18, 1941.  F. L. WASSELL  2,232,193
VISIBLE INDEX AND SIGNAL
Filed April 6, 1938
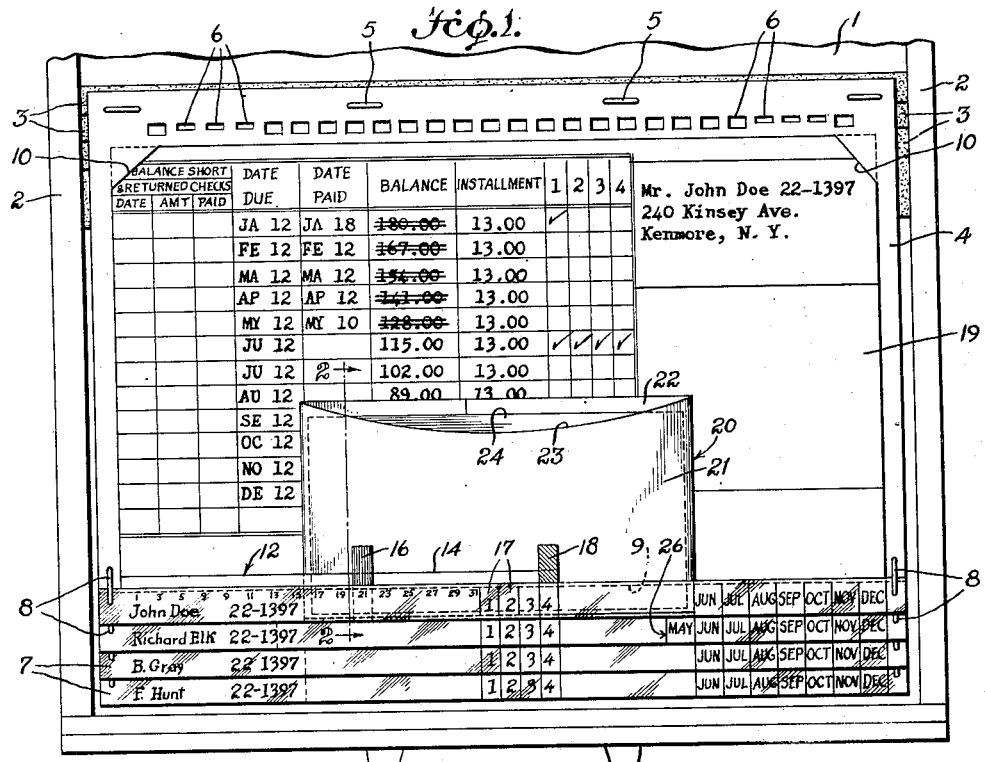
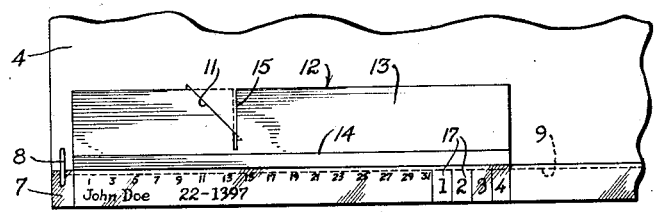
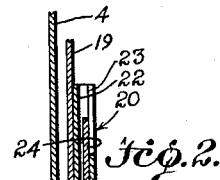
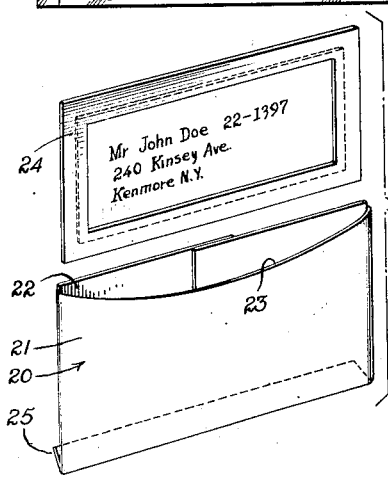
Frank Lloyd Wassell,
Inventor Patented Feb. 18, 1941

2,232,193

UNITED STATES PATENT OFFICE 2,232,193

VISIBLE INDEX AND SIGNAL

Frank Lloyd Wassell, New York, N. Y., assignor to Remington Rand Inc., Buffalo, N. Y.

Application April 6, 1938, Serial No. 200,473

13 Claims. (Cl. 129—16.7)

This invention relates to improvements in visible index equipment and particularly to an index where a sliding signal cooperates with a record card to effect economy in keeping records.

Heretofore in handling credit and collection matters and with reference to time purchases, it has been the custom to send the debtor a notice of the payment due several days in advance of the due date. This requires the typing of an envelope, checking of the index to determine the next due date for a payment on account follow-up dates and the enclosing of the proper notice in the envelope identifying the account on which the notice was sent. This method of handling accounts has been found to be expensive and in order to eliminate some of this expense, concerns have adopted the coupon book method now in current use in many financial institutions, in which a debtor is given a book of coupons corresponding in number to the number of payments that are to be made on the account. These coupons are removed from the book by the debtor one at a time and forwarded with his payment on account, and in this way considerable labor and expense is saved in the collection of the account.

The present invention provides a record for credit and collection accounts and also for keeping other records, and is adapted to effect further economies in record keeping compared with other visible records. This record has a title insert associated with the record card containing an index to the account for visible indexing while a variable or progressive signal is used on the visible margin of the record card to indicate its condition at all times so that delinquent accounts may be readily determined. The present invention also facilitates the use of a signal to indicate whether an account is habitually delinquent or whether delinquencies have occurred in the past.

One of the signals used in connection with this index is in the form of an envelope that is adapted to receive and house a stencil where it is for use in connection with credit collection and accounting. This stencil is provided with the name and address on the account with which it is associated so that it may be used to stencil the name and account number on the account card, delinquent payment notices and all other records in connection with the account, thereby effecting a substantial saving in labor, in handling the account, while the signal provides a mounting for the stencil so it is housed with the account card making it readily accessible for use.

The invention comprehends a signal that will house a token stencil as mentioned above or other removable insert, in conjunction with its operation as a signal on a record card, that adapts it for use in keeping records of many other kinds than that referred to above.

The invention further comprehends the provision of a signal associated with a record card and a card holder therefor, so the record card when mounted upon the card holder retains the signal in its signalling position against detachment from the card or card holder.

The invention also provides a title insert having a novel means of interlocking the insert with a card or card holder through the formation of the title insert with means adapted to interengage with complementary parts on the card or card holder to detachably mount the title insert in position thereon.

In the drawing:

Fig. 1 shows a fragmentary portion of the front end of a visible card index tray containing a series of card holders in offset overlapping relation showing the invention in association with said card holders.

Fig. 2 is a cross section taken on line 2—2 of Fig. 1.

Fig. 3 is a fragmentary portion of a card holder illustrating the manner in which the insert is interlocked therewith.

Fig. 4 shows the signal and stencil or token in perspective in disassembled relation.

A panel or tray of the usual form used with visible index equipment is indicated at 1, and is usually provided at opposite sides with flanges 2 forming guideways for slidably receiving the ends of supporting strips 3. A card holder sheet 4 is secured to each strip 3 by any suitable means such as wire stitches 5. A plurality of aligned openings 6 adjacent to the margin of card holder sheet 4 secured to strips 3, forms a hinge so the major portion of the card holder can be hinged relative to its supporting strip.

The opposite margin of card holder sheet 4 is embraced by a transparent sheath 7 secured thereto by wire stitches 8 at opposite ends. Sheath 7 is usually formed of transparent Celluloid in the form of a strip folded about the margin of sheet 4 in the manner illustrated in Fig. 2, the free edge of the strip over the front face of sheet 4 being folded inwardly as shown in Fig. 2 at 9.

Card holder sheet 4 is formed with diagonal slots 10 adjacent to hinge openings 6 for receiving the corners of a record card opposite to the marginal portion that is engaged in sheath 7.

Card holders constructed as above described are well known in the art and in addition to the card holding slots 10, these card holder sheets 4 are also provided with other slots adapted to hold a card on the rear face of the card holder sheet arranged in such a manner, that all four corners of a card applied to the rear face of the card holder sheet are engaged in diagonal slots, one of which is illustrated in Fig. 3 at 11, and is used in connection with the present invention for holding title insert 12 in a fixed position on the card holders.

Title insert 12 is formed from a folded strip of paper having the fold inserted into sheath 7 over the front face of card holder sheet 4 and preferably with one end at the left hand side of the card holder, in the manner illustrated in Fig. 3. When the folded edge of insert 12 is engaged in the fold of sheath 7, the rear portion 13 of insert 12, which is longer than front portion 14, has its upper edge positioned so that it just clears the upper end of slot 11. A slit 15 perpendicular to the edge of rear portion 13, extends inwardly from the edge and is positioned so that a corner or projection is provided between the ends of insert 12 in such a position that when the corner is engaged or inserted through slot 11, one end of insert 12 will terminate adjacent to the left hand end of the card holder in a position, adjacent to stitch 8.

The title insert 12 has a length slightly greater than half the width of the card holder so that the right hand free margin of card holder sheet 4 is not covered by the insert. This title insert is for the purpose of receiving the name, account number and address, or other index for the record contained on a record card to be carried by the card holder. The portion of the insert 12 exposed to view through sheath 7 is visible due to the offset relation of each card holder with respect to the other, so that the index information on the insert can be seen at a glance. Insert 12 is printed with odd numbers from one to thirty-one so signal 16 may be positioned over one of these numbers to indicate a day of the month on which the record becomes active or requires attention. Insert slip 12 also has four printed spaces indicated by the numeral 17 containing the numbers one to four, used for signalling purposes so signal 18 may be associated therewith to show at a glance some particular condition of the record indexed thereby.

A record card 19 is applied to the card holder with the lower margin engaged in sheath 7 while the upper corners are engaged in slots 10 to detachably mount the record card on the card holder. This record card may be printed with any desired form for the kind of record that is to be kept on the card and visibly indexed, and in the present instance, it illustrates a printed record on the card in Fig. 1 designed for use in keeping a record of payments made on an installment account and other information pertinent to some of the details of the transactions that are engaged in during the collection of the account. The record also contains a space for the name, address and account number of the person whose record is kept on the card.

Another signal that forms one of the features of the invention is indicated at 20 and comprises a sheet of paper having the central portion formed to provide a front 21 with opposite ends folded upon the central portion and secured together to form a rear side 22. A tubular structure forming an open ended envelope is provided by the front and back structure. The upper edge of front 21 is cut away in the central portion so as to terminate below rear portion 22 as indicated at 23 to provide convenient access to the inside of the envelope and also to expose a portion of a token or stencil 24 housed in the envelope between front 21 and back 22. The opposite end of envelope or signal 20 is provided with flap 25 folded rearwardly and upwardly over back 22. This signal 20 is superimposed on the front face of card 19 with flap 25 extended around the lower edge of card 19 and over the rear face thereof as clearly shown in Fig. 2. When signal 20 is in this position on card 19, the card and signal are inserted into sheath 7 with the card and signal engaged between the front and rear portions of title insert 12, also indicated in the cross section in Fig. 2, until the upper corners of card 19 can be flexed for insertion in slots 10 as clearly shown in Fig. 1. In this position signal 20 may be slidably moved back and forth along the lower edge of card 19 from the left hand side of the card holder to the right hand side thereof.

When signal 20 is positioned at its left hand limit of movement, the portion engaged in sheath 7 will be concealed behind front portion 14 of title insert 12, but when signal 20 is moved to the right, the right hand lower edge portion will become visible through sheath 7 as it moves beyond the end of opaque insert 12 in the manner illustrated in Fig. 1, whereupon it will cover the visible margin of card 19 exhibited through sheath 7 and in this way create a variable signal that has signalling cooperation with the margin of card 19 that is visible beyond the end of insert 12. This visible margin of card 19, in the illustration in the drawing, is printed with the names of the months of the year so signal 20 can be moved to the right to cover the months of the year progressively, as payments are made on the account. A glance at the margin of the card and signal in sheath 7 will indicate the next month in which a payment becomes due on the account shown on the record.

Flap 25 slidably guides signal 20 along the lower edge of card 19 and prevents signal 20 from being removed from sheath 7 without removing card 19. Therefore, when it is desired to withdraw token 24 for its desired use, it may be slidably withdrawn from its housing in the envelope forming signal 20 without disturbing its signalling position on the card.

Token 24 for the purpose of collection and credit accounts of the character illustrated in the drawing will be in the form of a stencil in the normal use of the invention, so the name and address of the person or other identification data for the account kept on record card 19 can be typed or otherwise placed on stencil 24. The stencil may then be used to apply the name and address to mailing envelopes, to record card 19 in the manner illustrated, and to insert 12 and any other records that are kept in connection with the account.

It has been found that several advantages are gained from this construction of a record. The stencil can be typed and used to reproduce the name and address much more rapidly on all records, notices, envelopes and other papers kept or used in connection with the account, than where the name is typewritten in each instance. A considerable amount of labor in keeping the record is therefore saved, and signal 20 provides a more convenient place to store stencil or token 24 when it is not in use. Signal 20 in housing token 24 eliminates indexing since the token and account are indicated together.

Signal 20 in being formed of an envelope can be made of suitable paper or other material adapted to protect the stencil or token 24 so that foreign matter such as ink, etc., will not be transferred onto record card 19 or other adjacent objects and dirty the record. In adition, when token 24 is in envelope 20 it provides a handle portion along the upper edge of signal 20 above sheath 7 that facilitates the manual grasping of signal 20 when it is desired to slide the signal and change its signalling position. Signal 20 may be of any desired color in order to provide a color contrast for more effective signalling.

Figure 1 illustrates four card holders in offset overlapping relation arranged in the usual manner in the tray so the lower margin of each card and the title insert and signals are visible through sheath 7, while the portions of the record above sheath 7 on each card holder are covered up by the card holder located above. The four card holders illustrated show how signal 20 indicates the next month in which a payment is due and also indicates how easy it is to pick out an account where a payment is delinquent, as indicated by signal 20 on the card holder below the top one shown in detail in Fig. 1, where the signal is positioned so that it exposes the month "May" on the lower edge of the record card in the card holder, indicated at 26, while all of the other signals 20 in the several card holders illustrated are positioned to show the next payment due in the month of "June." This result is occasioned by reason of the slidable positioning of signal 20 to cover up a varying amount of the margin of card 19.

In accordance with illustration shown in Fig. 1 the due dates for all payments are entered on record card 19 in advance and at the time the record is made out. The amount of each installment is entered at the time the record is made out together with the total amount due on the account and the balances due on account after each payment is made. When a payment is made on the account in accordance with the record shown in Fig. 1 of the drawing, the date on which the payment is made is stamped opposite the due date for the payment in the column headed "Date paid" and the balance due entry is crossed out in the manner illustrated in Fig. 1. It can then be readily determined that the next payment is due on June 12, and the balance due on account is $115.00.

The columns to the right of that headed with the word "Installment" are numbered from one to four, and in the illustration shown are intended to be used for receiving check marks, as illustrated, to indicate when and how many times it has been necessary to send delinquent notices in regard to the payment due. As shown in Fig. 1, the record illustrates a check mark in the column numbered "1" for the payment due January 12, showing that a first delinquent notice was sent out in connection with the first payment on the account. The spaces numbered one to four on insert 12 and indicated at 17 are for the same purpose as these columns on record card 19 and are adapted to have the signal 18 associated therewith to show which notice has been sent out in connection with the account. The record illustrates signal 18 over the number 4 and also shows four check marks in the columns numbered from one to four opposite the due date June 12. This would indicate in connection with the record as shown, that the fourth notice has been sent out for delinquency in payment of the amount due June 12.

Signal 16 is set opposite the day of the month when the account is due for the next follow-up. In sending out each delinquent notice, stencil 24 is used for printing the name and address on the envelope and the notice contained within the envelope and any other records that are made at the time these delinquent notices are sent out or any other information is recorded in regard to the account.

It is to be understood that while a collection and credit account illustration is made for the purpose of showing how insert 12, record card 19, and signal 20 are used, that signal 20 and the insert together with signals similar to those indicated at 16 and 18 may be used in connection with numerous different types of records, and the illustration is only one example of how the invention may be used. In fact, the invention may be applied in connection with the keeping of any records when the record must be followed from time to time.

The invention claimed is:

1. An index device, comprising a card, a signal formed with a flap and having dimensions less than said card, said signal being superimposed on one margin of said card with said flap extending around the edge of said card and over the opposite face of said margin, and means on said margin of said card slidably mounting said signal thereon against removal in cooperation with said flap, said means operating to conceal a portion of said signal and expose another portion thereof, the exposed portion being variable by sliding of the signal for signalling cooperation with the margin of said card.

2. An index device, comprising a card, a signal, token supporting means formed on the signal, said signal being formed to provide guide means, and means on one margin of said card cooperating with said guide means for slidably mounting said signal thereon with a portion exposed and another portion concealed, the exposed portion being variable by sliding of the signal for signalling cooperation with the margin of said card, said last-named means cooperating with said guide means to normally prevent detachment of said signal from said card margin during attachment and detachment of said token on said signal.

3. An index device, comprising a card, a signal having a flap extending around an edge of said card so that said signal and flap overlie opposite faces of a portion of one margin thereof, a stationary shield strip embracing a portion of the margin of said card and portions of said signal for concealing portions of said signal, the remaining portions of said signal being visible beyond said shield strip and variable by sliding of the signal along the edge of said card for signalling cooperation with said card margin, and means detachably retaining said signal, and shield strip on said card margin.

4. An index device, comprising a card, a signal formed of a tubular envelope open at one end and having a flap at the other end for closing said other end, said envelope being superimposed on one face of said card with said flap folded about one edge of said card to provide for sliding movement of said signal along the margin of said card having said edge, means on the margin of said card for slidably mounting said signal thereon with a portion exposed and another portion concealed, the exposed portion being variable by sliding of the signal for signalling cooperation with the margin of said card, and a token housed in said envelope and removable through said open end, said flap cooperating with said card during removal of said token to retain said envelope in signalling position.

5. An index device, comprising a card holder having a supporting means attached to one margin and the opposite margin being free, a card superimposed on said card holder with one margin overlying the free margin of said card holder, a signal having guide means slidably engaged on the free margin of said card, means on the free margin of said card holder embracing the free margin of said card and signal for detachably retaining said card and signal thereon, means on said card holder detachably receiving portions of said card opposite to said free margin and cooperating to normally retain the free margin of said card and said signal engaged in said first-mentioned retaining means against detachment, and means concealing a portion of said signal while the remaining portion is exposed, the exposed portion being variable by sliding of the signal for signalling cooperation with the margin of the card.

6. The combination in an index, of a card holder, a transparent sheath enclosing a free margin thereof, said card holder having retaining means opposite to said sheath, a card having opposite margins detachably engaged in said sheath and with said retaining means for support on said card holder, a signal engaged in said sheath and superimposed on the card margin in said sheath, said signal having a flap embracing the free margin of said card in said sheath for retaining said signal for sliding movement along the free margin of said card, and an insert embracing said card and signal in said sheath and detachably interlocked with said card holder for concealing a portion of said signal while the remainder is exposed, said exposed portion being variable by sliding said signal for signalling cooperation with the margin of said card.

7. The combination in an index, of a card holder, a transparent sheath enclosing a free margin thereof, said card holder having retaining means thereon at the side opposite to said sheath and having a slot adjacent said sheath, a card superimposed on said card holder with one margin engaged in said sheath and portions of the opposite margin engaged with said retaining means for detachably mounting said card on said card holder, a signal formed of an envelope open at one end and having a flap at the other end slidably embracing the free margin of said card in said sheath and retained therein against detachment while said card has the opposite margin engaged with said retaining means, a token housed in said envelope and removable through said open end, and an insert in said sheath embracing the free margin of said card and signal and formed to provide a corner portion engaged in said slot for retaining said insert in said sheath against sliding movement and detachment, said insert having a portion engaged over said signal for concealing a portion of said signal, the remaining portion of the signal being exposed, said exposed portion being variable by sliding of the signal for signalling cooperation with the margin of said card.

8. The combination in an index, of a card holder, a transparent sheath enclosing a free margin thereof, said card holder having retaining means thereon at the side opposite to said sheath, a card superimposed on said card holder with one margin engaged in said sheath and portions of the opposite margin engaged with said retaining means for detachably mounting said card on said card holder, and an envelope open at one end and provided with a flap at the other end, said envelope being engaged on the margin of said card in said sheath with said flap extending around the edge of said card and over the back thereof, whereby said envelope is retained in interlocked engagement on said card in the attached position of said card on said card holder against detachment until said card is detached from said card holder.

9. The combination in an index, of a card holder, a transparent sheath enclosing a free margin thereof, said card holder having a slot formed therein adjacent said sheath, a folded insert in said sheath having at least one free edge projecting beyond said sheath and formed with a portion engaged in said slot for locking said insert in said sheath, and a card superimposed on said card holder with one margin detachably engaged in said sheath and between the fold portions of said insert.

10. In a visible index, a card holder, a transparent sheath enclosing one margin thereof, a slot formed in said card holder adjacent said sheath in acute angular relation thereto, and an insert formed of a folded strip having one fold longer than the other, the long fold having a slit extending perpendicular to the edge thereof, the fold of said insert engaging in said sheath with said longer fold extending beyond said sheath and having one of the corners formed by said slit extending through said angular slot in said card holder for interlocking said insert in said sheath.

11. In a visible index, a card holder having a sheath on one margin and a diagonal slot formed therein adjacent to said sheath, and a title insert comprising a folded paper strip having one fold longer than the other and having the long fold formed with a slit extending perpendicular to the edge thereof, said insert being adapted to have one of the corners adjacent said slit inserted through the diagonal slot in said card holder when the fold portion is in said sheath for locking said insert on said card holder.

12. A title insert for visible card indexes wherein a card holder has a sheath on one margin and a diagonal slot adjacent thereto near one end, comprising a long narrow strip of paper folded lengthwise to provide one fold having a width greater than the other, said fold of greater width having a slit formed therein near one end extending inwardly from the edge and substantially perpendicular to said fold, whereby said insert may be applied to said card holder with the fold engaged in said sheath and one of the corners adjacent said slit inserted through the diagonal slot in said card holder for locking said insert in place on said card holder.

13. An index device, comprising a card, a signal, guide means on said signal slidably cooperating with portions of said card for guiding said signal in movement along a margin of said card for signalling cooperation therewith and retaining said signal against lateral movement, a token supporting pocket formed on said signal for detachably receiving and supporting a token therein, said pocket and said guide means cooperating to retain said signal slidably engaged with said card during removal and attachment of said token on said signal and retain said token in position on said signal during sliding movement thereof on said card.

FRANK LLOYD WASSELL.